Feb. 13, 1940.   C. L. W. FUQUA   2,190,115
SANITARY APPLICATOR FOR DOGS
Filed April 19, 1938

Clara Louise W. Fuqua
INVENTOR
BY Victor J. Evans & Co.
ATTORNEYS

Patented Feb. 13, 1940

2,190,115

UNITED STATES PATENT OFFICE 2,190,115

SANITARY APPLICATOR FOR DOGS

Clara Louise Wolf Fuqua, Brownsville, Tex.

Application April 19, 1938, Serial No. 202,982

1 Claim. (Cl. 119—143)

The invention relates to an applicator for female dogs, and more especially to a sanitary protective harness for such dogs.

The primary object of the invention is the provision of a harness of this character, wherein on the wearing thereof by a female dog it will be protected from male dogs during conception periods, these being generally termed "in heat", or while the female dog is in breeding condition, thereby checking unsanctioned breeding, as well as assuring against soilings within a household from fluid discharges occurring from the female sex organ throughout such periods.

Another object of the invention is the provision of a harness of this character, wherein the same is susceptible of adjustment for the fitting thereof to dogs of different sizes, eliminating discomfort to the dogs during the wearing of the same and is adaptable more especially to such dogs of the pet class required to be confined within an apartment, house, room or other living quarters for people.

A further object of the invention is the provision of harness of this character, which is simple in construction, readily and easily applied and removed, neat in appearance so as not to detract from the dog's appearance or create undue attention while worn, conveniently adjusted, sustained in proper protective position during the wearing of the same, and inexpensive to manufacture.

With these and other objects in view the invention consists of the features of construction, combination and arrangement of parts as will be hereinafter more fully described, illustrated in the accompanying drawing, which in its disclosure is the preferred embodiment of the invention, and as pointed out in the claim hereunto appended.

In the accompanying drawing.

Similar reference characters indicate corresponding parts throughout the several views in the drawing.

Figure 1:
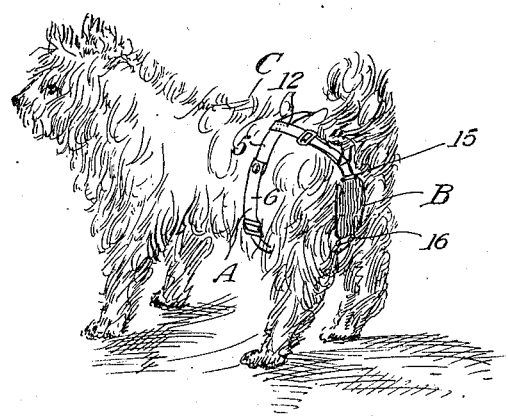
Figure 1 is a perspective view of a female dog showing the harness constructed in accordance with the invention applied for the wearing thereof.
Figure 2:
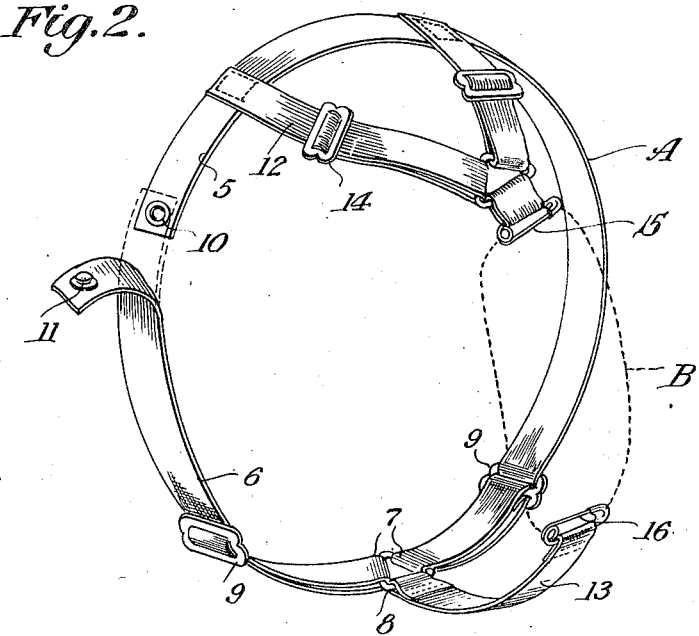
Figure 2 is a perspective view of the harness removed, the protective pad being in dotted lines while the harness is in full lines.

Referring to the drawing in detail A designates generally the harness and B the protective pad, respectively, these together creating the invention hereinafter set forth.

The harness A comprises a body belt including several variable length straps 5 and 6, respectively, which may be made from elastic or non-elastic webbing. These straps 5 and 6 at a pair of the ends adjacent to each other are folded or turned on themselves as at 7, being trained through a coupling ring 8, and at the extreme terminals are fastened to adjustable runners or slides 9 which are carried upon the said straps 5 and 6. Thus by adjusting the said runners or slides 9 the size of the belt can be changed or varied.

The other pair of ends of the straps 5 and 6 are fitted with the parts 10 and 11, respectively, of a snap fastener. In this way the harness A can be readily and easily applied or removed and in the application the belt embraces the body of the animal, such as a female dog denoted at C in the wearing of said harness.

On the belt and carried by the strap 5 thereof and the ring 8 are the croup loop 12 and crotch tab 13, respectively. The loop 12 is adjustably built, through the use of the runners or slides 14, while the tab 13 is preferably made from elastic webbing for self adjustment.

The loop 12 is fitted with a fastener 15 and similarly the tab 13 is fitted with a fastener 16, these fasteners being in the form of safety pins of conventional kind for the detachable securing of a protective pad or sanitary diaper or napkin B thereto. This pad, diaper or napkin B is to cover the sex organ of the female dog C in the wearing of the harness for absorbing fluid discharge from such organ occurring during breeding periods or when the animal is as generally termed "in heat."

The adjustability of the harness enables the fitting thereof to dogs of different sizes and assures proper comfort in its wearing when applied.

The harness when applied has the croup loop 12 uppermost of the belt with the tail of the dog trained through said loop, while the tab 13 will be lowermost of the belt to be disposed in the crotch between the hind or rear legs of the said dog, the pad, diaper or napkin B being in this arrangement firmly held in covering position to the sex organ of the dog for protection as hereinbefore set forth.

The harness A may be made white, black or of any color desired so as to blend with the hair of the dog and in this way will be less visible when worn thus minimizing notice by the public during the wearing thereof with the least detraction from the appearance of the dog.

The pad, diaper or napkin B through absorption of fluid discharges from the sex organ of the dog C avoids staining or soiling furnishings within a household.

What is claimed is:

A harness of the character described comprising a body belt including several variable length straps respectively, the ends of adjacent straps being turned on themselves, adjustable runners fitting said pair of straps and having the turned ends connected thereto for varying the size of the body belt, a coupling ring loosely fitting the turned ends of said straps, means for fastening the other ends of said straps together, a substantially V-shaped adjustable croup carried by said body belt directly opposite the coupling ring and having a coupling ring associated therewith, and fastening tabs loosely connected to both coupling rings and having fasteners for separably connecting a protective pad thereto.

CLARA LOUISE WOLF FUQUA.